United States Patent [19]

Murayama et al.

[11] Patent Number: 4,514,808
[45] Date of Patent: Apr. 30, 1985

[54] DATA TRANSFER SYSTEM FOR A DATA PROCESSING SYSTEM PROVIDED WITH DIRECT MEMORY ACCESS UNITS

[75] Inventors: Masaki Murayama, Fussa; Manjiro Iida, Oume, both of Japan

[73] Assignee: Tokyo Shibaura Denki Kabushiki Kaisha, Kawasaki, Japan

[21] Appl. No.: 377,044

[22] Filed: May 11, 1982

Related U.S. Application Data

[63] Continuation of Ser. No. 32,880, Apr. 24, 1979, abandoned.

[30] Foreign Application Priority Data

| Apr. 28, 1978 | [JP] | Japan | 53-50082 |
| Nov. 8, 1978 | [JP] | Japan | 53-136657 |
| Nov. 8, 1978 | [JP] | Japan | 53-136658 |

[51] Int. Cl.³ ............................................. G06F 3/04
[52] U.S. Cl. ......................................................... 364/200
[58] Field of Search ... 364/200 MS File, 900 MS File

[56] References Cited

U.S. PATENT DOCUMENTS

| 3,810,114 | 5/1974 | Yamada et al. | 364/200 |
| 3,986,170 | 10/1976 | Valassis et al. | 364/200 |
| 4,004,281 | 1/1977 | Bennett et al. | 364/200 |
| 4,015,246 | 3/1977 | Hopkins, Jr. et al. | 364/200 |
| 4,032,893 | 6/1977 | Moran | 179/15 AL |
| 4,041,472 | 8/1977 | Shah et al. | 364/900 |
| 4,057,846 | 11/1977 | Cockerill et al. | 364/200 |
| 4,067,059 | 1/1978 | Derchak | 364/200 |
| 4,085,448 | 4/1978 | Kogge | 364/900 |
| 4,093,981 | 6/1978 | McAllister et al. | 364/200 |
| 4,151,593 | 4/1979 | Jenkins et al. | 364/200 |
| 4,213,177 | 7/1980 | Schmidt | 364/200 |
| 4,237,543 | 12/1980 | Nishio et al. | 364/900 |
| 4,271,466 | 6/1981 | Yamamoto et al. | 364/200 |

OTHER PUBLICATIONS

Walker, "Comments on S-100 Bus Extension", Tech. Forum, 1/79, Byte Publications.
Morrow et al., "Proposed Standard for the S-100 Bus," NCC' 78 Personnal Computing Digest, 5/78, pp. 297-316.

Primary Examiner—Eddie P. Chan
Attorney, Agent, or Firm—Kenyon & Kenyon

[57] ABSTRACT

A data transfer system is disclosed which includes a main memory, a memory control unit for controlling the operation of the main memory, a central processing unit, a plurality of direct memory access units each provided with at least two data transfer bus widths, a common data bus line, and a common memory address-/control line. A control line is provided for distinguishing between the at least two data transfer bus widths and is only connected between a direct memory access unit provided with the memory control unit, the central processing unit and one of the at least two data transfer bus widths. When data is transferred, using one of the data transfer bus widths, the control line is energized with a control signal which is delivered to the memory control unit. On the other hand, the direct memory access unit which has the other data transfer bus width is not connected to the control line thereby preventing it from becoming energized.

The memory control unit controls the operation of a gate circuit between the memory data line which is connected between the main memory and the data bus line and the read data line and generates a write enable signal for effecting a writing of data in byte units in either an even number address or an odd number address thereof.

6 Claims, 9 Drawing Figures

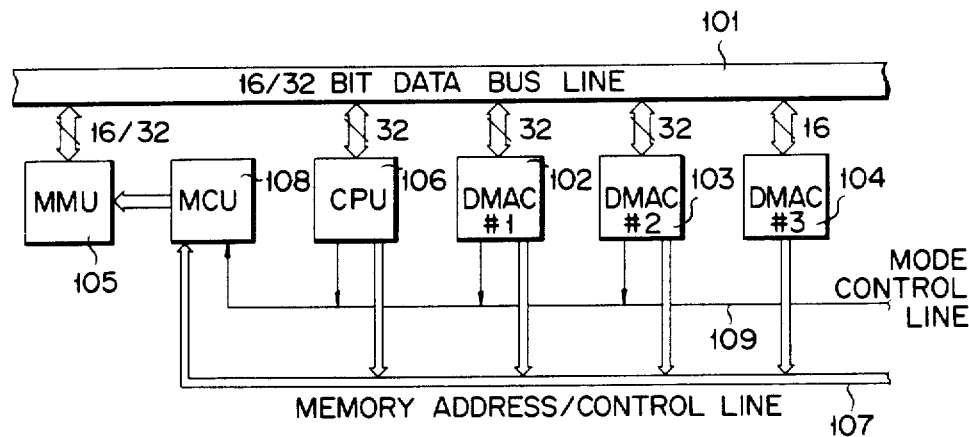
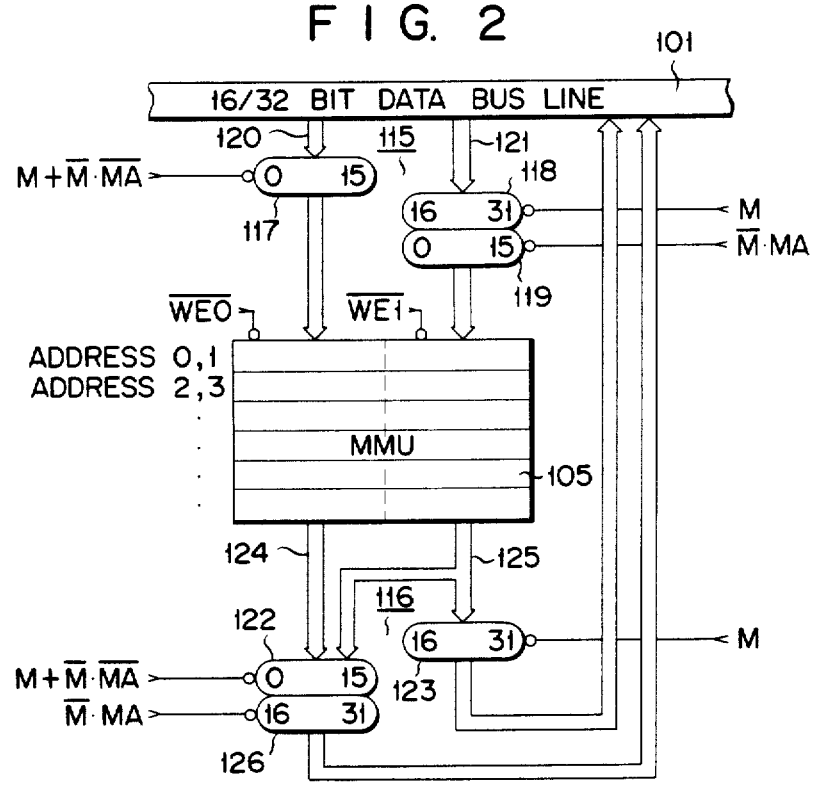

WRITE TIMING SIGNAL

DATA TRANSFER SYSTEM FOR A DATA PROCESSING SYSTEM PROVIDED WITH DIRECT MEMORY ACCESS UNITS

This is a continuation of application Ser. No. 32,880 filed Apr. 24, 1979, now abandoned.

BACKGROUND OF THE INVENTION

1. Field of the Invention

This invention relates to a data transfer system wherein devices such as a central processing unit (CPU), a memory and input-output control devices connected to a common bus line enable data transfer with different data transfer widths and more particularly to a system wherein a plurality of direct memory access units for handling different data transfer widths are connected to the common bus line.

With an integrated data-processing system, one or more input-output controls (hereinafter referred to as IOC) are generally connected to a data bus line with a central processing unit (hereinafter referred to as CPU) which is a central element of the system.

One or more input-output devices are connected to the IOC. Some IOCs to which are connected an input-output device such as a magnetic disk capable of transferring data at high speed have the function of direct accessing to memory without commands of the CPU.

Input-output control carried out in a data-processing system is herein defined to mean control of data transfer between the CPU or main memory and input-output devices. Data transfer is controlled by two systems: one system is to effect data transfer between an input-output device and main memory by executing an input-output instruction under control by a program; and the other is to carry out direct data transfer or direct memory access (DMA) between an input-output device and main memory independently of control by a program. The former system in which a program is executed each time one word is transferred has a lower data transfer speed than the latter or DMA system. Therefore, the former system is used with a low speed input-output device, while the latter system is used with a high speed input-output device.

The DMA system has the control function in hardware needed for data transfer between the IOC and main memory independently of control by the CPU. Upon receipt of a start command from the CPU, the DMA system undertakes data transfer between the IOC chip and main memory utilizing a cycle steal. The DMA system is operated through the following fundamental sequential steps.

(I) An input-output device is selected. The start address of transfer data and a number of words being transferred are preset in a register and word counter included in a direct memory access channel (abbreviated as "DMAC").

(II) The aforesaid start address is preset in an address register of the memory.

(III) A start command is issued from the CPU.

(IV) Data continues to be transferred until a count made by a word counter is reduced to zero. During this period, the CPU remains independent of said data transfer and can be used for any other operation than data transfer.

(V) When a count made by the word counter is reduced to zero, a termination interrupt denoting the completion of data transfer is supplied to a processor, which in turn processes said interrupt, and thereafter resumes the originally continued operation.

The above-mentioned DMA system processes input and output data far more quickly than when input and output data are processed by the execution of an input-output program by the CPU. Further advantage of the DMA system is that while data is transferred between an external device and main memory, the CPU remains idle and can take part in any other work.

In recent years, the DMA system is being required to operate at a much higher speed. One of the effective steps of ensuring the high speed data transfer by the DMA system is to increase the data width (a total bit number of data conducted through a common bus line each time).

An IOC with an expanded data transfer width can be connected to an improved data processing system of which the data transfer width is expanded, but an IOC with a narrower data transfer width cannot be connected.

In the prior art, therefore, IOCs had to be changed in design so as to be connectable to the DMA bus which is connected to the improved data transfer system, so that the IOCs can effect data transfer with an expanded data transfer width.

SUMMARY OF THE INVENTION

It is accordingly an object of this invention to provide a data transfer system of a data processing system having direct memory access which can effect the connection between a DMA unit of which the data transfer width is the data width of a DMA bus, and a DMA unit of which the data transfer width is a part of the data width of the DMA bus by switching the data transfer width of the DMA bus in accordance with a control signal on a control line.

Another object of the invention is to provide a data transfer system for a data processing system which is provided with a direct memory access unit and in which data consisting of a relatively small number of bits and data formed of a relatively large number of bits are transferred through a single DMA bus line, and data transfer is controlled by a control signal conducted through a mode control line.

Still another object of the invention is to provide a data transfer system for an apparatus which is provided with a direct memory access unit and in which data having a relatively large number of bits is divided into a plurality of data each having a smaller number of bits by a zone-specifying signal and the plurality of data are written in a main memory.

A further object of the invention is to provide a data transfer system for a data processing system which is provided with a direct memory access unit and in which data consisting of a relatively small number of bits and data formed of a relatively large number of bits are transferred through a single DMA bus line and the data transfer is controlled by a zone-specifying signal.

To attain the above-mentioned objects, this invention provides a data transfer system for a data-processing system provided with a main memory addressed for each half word and also with a plurality of direct memory access units which carry out data transfer to and from said main memory using a common address/control line and data bus line, said data transfer system comprising: first data transfer means for carrying out data transfer between at least one of the direct memory access units and main memory using the maximum data transfer width of the data bus line; and second data transfer means for carrying out data transfer between at least another of the direct memory access units and main memory using part of the maximum data transfer width of said data bus line.

BRIEF DESCRIPTION OF THE DRAWINGS

FIG. 1 is a block diagram showing the connection of a main memory, a CPU and DMACs according to one embodiment of this invention;

FIG. 2 is a detailed block diagram showing a connection between the data bus line and the memory unit of FIG. 1;

DETAILED DESCRIPTION OF THE INVENTION

Figure 3:
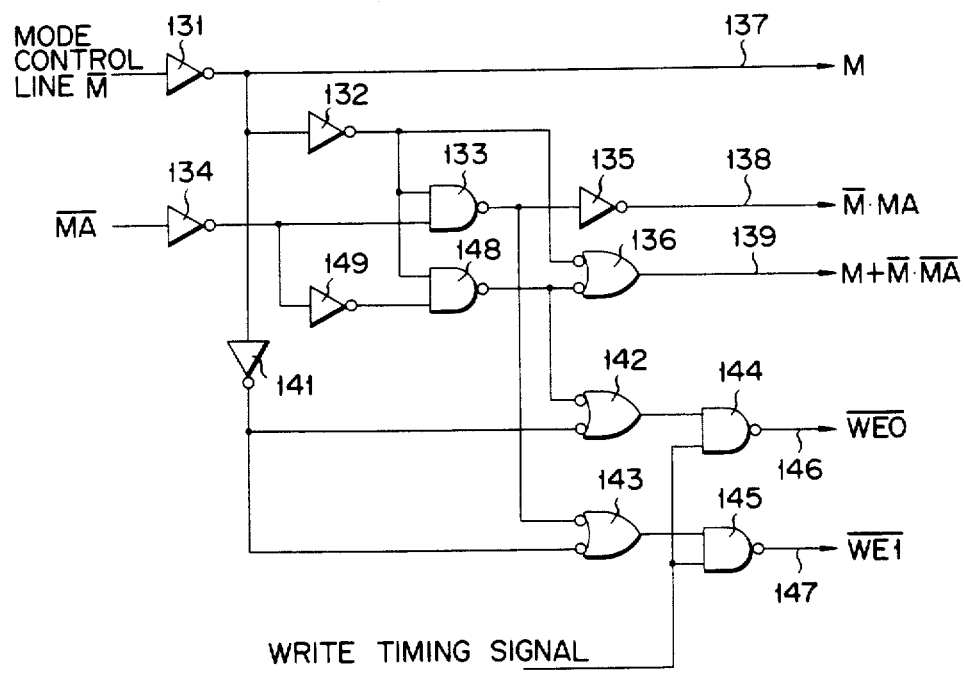
FIG. 3 is a circuit diagram of a gate control signal generator included in a memory control unit for generating a control signal to control the operation of the peripheral circuits of the memory shown in FIG. 2.

FIG. 1 shows the connection of a memory, a CPU and DMACs in a data processing system having a plurality of direct memory access units with different data transfer widths in accordance with one embodiment of this invention. The data bus line 101 is a DMA bus expanded to 32 bits from the conventional 16 bit bus line. Using the data bus line 101, 16-bit data transfer or 32-bit data transfer is effected. Connected to the data bus line 101 are direct memory access channels (DMAC #1, #2) 102, 103 allowing for the transfer of data formed of 32 bits, a direct memory access channel (DMAC #3) 104 through which 16-bit data is transferred, a main memory unit (hereinafter referred to as MMU) 105 and a central processing unit (hereinafter referred to as CPU) 106. In other words, when a previous system with 16-bit fundamental data transfer is expanded to a system with 32-bit data transfer, the conventional direct memory access channel with 16-bit data transfer can be directly applied to the expanded system.

The MMU 105 stores a program or data. The CPU 106 reads out program or data stored in MMU 105 and process data. The direct memory access channels (hereinafter referred to as DMAC) 102, 103, 104 respectively comprise an input-output controller (IOC) and input-output device. The CPU 106 and DMAC units 102, 103, 104 are connected to a memory control unit (referred to as MCU) 108 through a memory address-control line 107.

Address command from the CPU 106 or from any of the DMAC units 102, 103, 104 is conducted to the MCU 108 through the memory address/control line 107. The MCU 108 controls read/write operation of the MMU 105 in accordance with the received address command. The CPU 106 and DMAC units 102, 103 are connected to the MCU 108 through a mode control line 109. This mode control line 109 is used to distinguish between a DMAC 104 for handling 16-bit data and DMAC units 102, 103 for handling 32-bit data. Where the DMAC units 102, 103 with 32-bit data transfer mode and the CPU 106 read from and/or write into the MMU 105, the units 102, 103 and the CPU 106 change the mode control line in logical level "0".

The MCU 108 controls 32-bit read/write operation for the MMU 105 in response to the logic "0" level signal of the mode control signal 109.

In the write operation, 32-bit data is transferred to the MMU 105 through the data bus line from the DMAC 102, 103 and the CPU 106.

On the other hand, the DMAC 104 with 16-bit data transfer mode is not connected to the mode control line 109.

The mode control line 109 is constructed in wired OR fashion using pull up resistors and is usually set at the high logic level.

Therefore, where the data transfer between the DMAC 104 and the MMU 105 is effected, the MCU 108 controls the read/write operation for the MMU 105 in response to the high level signal of the mode control signal 109.

In the write operation, 16-bit data is transferred to the MMU 105 through a part of the data bus line 101 from the DMAC 104. The data read out from the MMU 105 is transferred to the DMAC 104 through a part of the data bus line 101.

The internal circuit of the MUC 108 will be described later.

FIG. 2 shows the arrangement of the peripheral elements of the MMU 105. Data conducted through the data bus line 101 is inputted to the MMU 105 through a memory data line 115. And the data read out from the MMU 105 through the read data line 116 is transferred to the data bus line 101. The MMU 105 stores words each consisting of 32 bits, and is provided with addresses for each half word of 16 bits. Where data is written in the MMU 105 in the 32-bit mode (namely, in the case where data transfer is effected using all the data lines of the data bus line 101), then gates 117, 118 are opened for the writing of said 32-bit data. The memory data line 115 comprises two data line units 120, 121 each consisting of 16 bits. The gate 117 controls the input of data from bit 0 to bit 15 of the data bus line 101 and the gate 118 controls the input of data from bit 16 to bit 31 of the data bus line 101.

Where data is inputted to the MMU 105 in the 16-bit mode (namely, in the case where 16-bit data transfer is effected using a part of the data line 101), then either the gate 117 or gate 119 is opened. In other words, the gate 117 is opened when 16-bit data is written in an even number address of the MMU 105, and the gate 119 is opened when 16-bit data is written in an odd number address of the MMU 105. Both gates 117, 119 control the writing of data from bit 0 to bit 15 of the data bus line 101.

The control of writing data in an even number address or in an odd number address is defined by the least significant bit of the memory address.

Both gates 117 and 119 are controlled so that data is written in an even number address when the least significant bit is "0" and data is written in an odd number address where the least significant bit is "1".

Where data is read out of the MMU 105 in a 32-bit mode, then gates 122, 123 are opened upon receipt of a prescribed control signal. 32-bit data thus read out is outputted to the data bus line 101.

The read data line 116 consists of two read line units 124, 125 each formed of 16 bits. The line 124 supplies the gate 122 with 16-bit data from bit 0 to bit 15 of the read data of the MMU 105. The line 125 supplies the gate 123 with 16-bit data from bit 16 to bit 31 of the read data of the MMU 105.

Where data is read out of the MMU 105 in the 16-bit mode, either the gate 122 or the gate 126 is opened. In other words, where 16-bit data is read out of an even number address of the MMU 105, the gate 122 is opened, and where 16-bit data is read out of an odd number address of said MMU 105, the gate 126 is opened. Though designed to handle data from bit 16 to bit 31 of the read data of the MMU 105, the gate 126 occupies a position similar to the gate 122 relative to the data bus line 101 for the necessity of sending forth data from bit 0 to bit 15 from the data bus line 101.

Where data is handled in the 16-bit mode (when the mode control line is at a high logic level), it is necessary, as previously mentioned, to change the state of a gate, according to whether reading and writing of data are to be carried out in an even number or an odd number address of the MMU 105. Said change is effected by, for example, the least significant bit MA of the address. Where said bit MA is at low in logic level, then an even number address of the MMU 105 is specified. Where said bit MA is at high in logic level, then an odd number address of said MMU 105 is designated.

The memory control unit (MCU) 108 supplies a control signal to the aforesaid gates. There will now be described by reference to FIG. 3 the operation of the MCU 108.

FIG. 3 shows the circuit arrangement of a gate control signal generator included in the MCU 108. There will now be described operation of the DMACs 102, 103 for handling data in the 32-bit mode and of the DMAC 104 for handling data in the 16-bit mode to carry out the writing and reading of both types of data with respect to the MMU 105. Now let it be assumed, for example, that the DMAC 102 for a 32-bit data carries out the writing of said data in the MMU 105. In this case, the DMAC 102 outputs the mode control line signal M to the MCU 108 so that the mode control line 109 is at a low logic level. The write address and the write command are transferred to the MCU 108 through the memory address/control line 107 from the DMAC 102 and the 32-bit write data is transferred to the MMU 105 through the data bus line 101. The mode control signal $\overline{M}$ at a low logic level becomes a high logic level through an inverter 131 which outputs the control signal M to the line 137. The gate 118 of FIG. 2 is powered and opened by the signal M. The signal on line 137 energized at a high logic level becomes a low logic level through the inverter 132 and is applied to the negative input OR circuit 136. The circuit 136 outputs a high level signal independently of the other input terminal thereof. Consequently, a line 139 is energized to provide a gate control signal $M + \overline{M}.\overline{MA}$.

The control signal $M + \overline{M}.\overline{MA}$ energizes the gate 117 of FIG. 2 to be opened.

Consequently, the write data on the data bus line 101 is inputted to the MMU 105 through the gates 117, 118.

The output signal M of the line 137 at a high logic level is inverted to a low logic level through the inverter 132 and is applied to the one input terminal of the NAND circuit 133. Then, the NAND circuit 133 produces a high level signal independently of the inverter 134.

The high level signal becomes a low logic level signal through the inverter 135. Then, the line 138 is not energized and the control signal $\overline{M}.MA$ is not produced.

On the other hand, a low level signal is applied to the negative input OR circuits 142, 143, which in turn generate high level signals.

The high level signals are applied to one of the input terminals of the NAND circuits 144, 145 and to the other input terminals is supplied a high level write timing signal. As a result, said NAND circuits 144, 145 produce a low level write enable signal $\overline{WE_0}$, $\overline{WE_1}$. Consequently, the write enable signals $\overline{WE_0}$, $\overline{WE_1}$ are produced from the lines 146, 147.

The write enable signals $\overline{WE_0}$, $\overline{WE_1}$ are applied to the MMU 105 of FIG. 2 and the write data is written in the address of the MMU 105.

The MMU 105 is substantially provided with such known memory driving circuits as an address register etc. the description of which is omitted since it is not directly related to the invention.

It is obviously understood that in the read/write operation of MMU 105, in accordance with the DMAC 102, 103, 104 and the CPU 106, the least significant bit of the memory address is negligible and the MMU 105, constructed in even number address and odd number address, is accessed.

Also in the read operation of MMU 105 by DMAC 102, the mode control line signal $\overline{M}$ from the DMAC 102 is outputted to the MCU 108 through the mode control line 109 and the gate control signals M and $M + \overline{M}.\overline{MA}$ in FIG. 3 are produced on lines 137, 139, respectively.

The read address and the read command of the DMAC 102 are transferred to the MCU 108 through the memory/address control line 107.

The gate control signals M and $M + \overline{M}.\overline{MA}$ are applied to the gates 122 and 123 shown in FIG. 2 to open the gates. The contents of the memory 105 in the location specified by the read address thereof are read out of the DMAC 102. 32-bit data thus read out is supplied to the data bus 101 through the gates 122, 123, and then transferred to the DMAC 102. Data transfer with respect to the CPU 106 and DMAC 103 is carried out in the same manner is described above.

There will now be described the operation of writing data in the 16-bit mode by DMAC 104. In this mode, 16-bit write data from the DMAC 104 is transferred to the MMU 105 through a part of the data bus line 101. Also the write address and the command are transferred to the MCU 108 through the memory address control line 107.

The DMAC 104 is not connected to the mode control line 109, the mode control line 109 keeps its logic level high when the DMAC 104 is in operating state.

Consequently the high level signal of the line 109 becomes low level through the inverter 131 shown in FIG. 3 and the line 137 does not produce the control signal M. The low level signal from the inverter 131 becomes high level through the inverter 132 and is applied to the one input terminal of the NAND circuit 133. When the even number address is specified (namely, the least significant bit of the write address is "0") the least significant bit signal $\overline{MA}$ of the memory address becomes a high logic level and the low level signal is applied to the other input terminal of the NAND circuit 133 through the inverter 134. Thus, the NAND circuit 133 produces a high level signal. The high level signal becomes a low logic level through inverter 135. As a result, the line 138 is not energized, nor is a gate control signal $\overline{M}.MA$ generated. A high level signal from the inverter 132 is applied to one of the input terminals of the NAND gate 148, the other input terminal of which is supplied with a high level signal through the inverter 149. Consequently, the NAND gate 148 generates a low level signal, which is supplied to one of the input terminals of the negative input OR circuit 136 to have its low level changes to a high level. The other input terminal of the negated input OR circuit 136 is supplied with a signal whose logic level has been inverted from high to low by the inverter 132. Accordingly, the negative input OR circuit 136 produces a high level signal, thereby energizing the line 139 to generate a gate control signal $M+\overline{M}.\overline{MA}$. The signal $M+\overline{M}.\overline{MA}$ energizes the gate 117 shown in FIG. 2.

Thus, the write data is inputted to the MMU 105 through the gate 117 in accordance with a part of the data bus line 101 (from bit 10 to bit 15).

One of the input terminals of the negated input OR circuit 142 is supplied from the NAND circuit 148 with a signal whose logic level has been inverted from low to high. The other input terminal of said negative input OR circuit 142 is supplied from an inverter 141 with a signal whose logic level has been inverted from high to low. As a result, the negative input OR circuit 142 produces a high level signal. The NAND gate 144 which is supplied with not only said high level signal, but also a write timing signal at a high logic level outputs a write enable signal $\overline{WE}_0$ at a low logic level. The write enable signal $\overline{WE}_0$ is applied to the MMU 105 in FIG. 2 and the write data is written in the even number address of the MMU 105 specified by the write address. In the above write operation, no data is written in the odd number address next to the even number address since no data and no write enable signal $\overline{WE}_1$ is given.

One of the input terminals of the negative input OR circuit 143 is supplied from the NAND circuit 133 with a signal whose logic level has been inverted from high to low. Said input terminal is further supplied from the inverter 141 with a signal whose logic level has been reversed from high to low. Consequently, the negative input OR circuit 143 generates a low level signal, which is supplied to a NAND circuit 145. This NAND circuit 145 which is supplied with not only the above-mentioned low level signal but also a write timing signal which is at a high logic level issues a high level signal. At this time the line 147 does not produce a write enable signal $\overline{WE}_1$. In the write operation in an even number address, as it is clear from the above description, the gate 117 is opened and a 16-bit data is written in the even number address of the MMU 105.

Where data is read out of an even number address of the MMU 105 by the DMAC 104, the circuit of FIG. 3 produces a gate control signal $M+\overline{M}.\overline{MA}$ upon receipt of an even number address-specifying signal (the least significant bit of the memory address bit $\overline{MA}=$ "1") from the DMAC 104, as in the case of the writing of data. Said gate control signal $M+\overline{M}.\overline{MA}$ is used to open the gate 122. Therefore, of the contents of the location of the memory 105 read out by the DMAC 104, a 16-bit data in the even number address is outputted from the gate 122. The 16-bit data is transferred to the DMAC 104 through a part of the data bus line 101 (from bit 0 to bit 15).

There will now be described operation where data is written in an odd number address of the MMU 105 by the DMAC 104. The write data, the write address and the write command are omitted as they have been described above.

In the access for the odd number address, the least significant bit of the memory address $\overline{MA}=0$, a high level signal from the inverter 134 is produced. Accordingly, the NAND circuit 133 is supplied with high level signals, and generates a low level signal. This signal has its logic level changed from low to high by the inverter 135. Accordingly, the line 138 is energized to produce a gate control signal $\overline{M}.MA$. The NAND circuit 148 is supplied with a low level signal from the inverter 149 and also with a high level signal from the inverter 132, eventually producing a high level signal. As a result, the negative input OR circuit 136 is supplied with high level signals and generates a low level signal. Accordingly, the line 139 is not energized, nor is the gate control signal $M+\overline{M}.\overline{MA}$ produced.

The negative input OR circuit 142 is supplied from the NAND circuit 148 with a signal whose logic level is a high, and also from the inverter 141 with a signal whose logic level has been changed from high to low. As a result, the negative input OR circuit 142 outputs a high level signal. The NAND circuit 144 is supplied with not only this high level signal, but also a write timing signal having a high logic level, eventually producing a low level signal. Consequently, the line 146 does not produce a write enable signal $\overline{WE}_0$. The negative input OR circuit 143 is supplied from the NAND circuit 133 with a low logic level signal, and also from the inverter 141 with a signal whose logic level has been changed from high to low. Accordingly the negative input OR circuit 143 generates a high level signal. At this time, the NAND circuit 145 is supplied from said negative input OR circuit 143 with a high level signal and a write timing signal which is a high logic level, eventually generating a low level signal. Therefore, the line 147 produces a write enable signal $\overline{WE}_1$. Accordingly, the gate 119 in FIG. 2 is energized by the gate control signal $\overline{M}.MA$ and the data transferred by a part of the data bus line 101 (from bit 0 to bit 15) is inputted to the MMU 105 through the gate 119.

The write enable signal $\overline{WE}_1$ is applied to the MMU 105, thus the data is written in the odd number address of the MMU 105 specified by the memory address.

In the write operation, no data is written in the odd number address next to the even number address as no data and no write enable signal $\overline{WE}_0$ are given.

Where data is read out from an odd number address of the main memory 105 by the DMAC 104, an output gate control signal $\overline{M}.MA$ is produced from the circuit of FIG. 3 upon receipt of an odd number address-specifying signal (the least significant bit $\overline{MA}=$"0") from the DMAC 104, as in the case of writing data in an odd number address of the DMAC 104. The gate control signal $\overline{M}.MA$ is used to open the gate 126. Accordingly, of the contents of the location of the memory 105, a 16-bit data in the odd number address is outputted from the gate 126.

The 16-bit data is transferred to the DMAC 104 through a part of the data bus line 101 (from bit 0 to bit 15).

There will now be described the arrangement and operation of said DMACs. The DMACs 102, 103, 104 are each formed of an input-output channel, which consists of an address register, data counter, data transfer completion detection circuit and DMA control circuit. The contents of the address register are delivered to the memory address controller line of an input-output interface to specify any of the addresses of the MMU 105 at the time of data transfer. Unlike the case where data is transferred under control of a program, there is additionally provided a flip-flop circuit for issuing an instruction signal for data transfer. This flip-flop circuit may be formed of a model 8085 manufactured by Intel Corporation. The sequential steps of data transfer by the DMA comprises three phases: initial processing, data transfer processing and termination processing. In the initial processing, a channel word setting command included in an input-output instruction signal causes the start address of the MMU 105 for data transfer to be preset in an address register and a number of words being transferred to be preset in a word counter. Up to this point in time, the DMA undertakes data transfer under control of a program, and later carries out data transfer all by hardware until transfer of data words is terminated. Where data from an input-output device is preset in a data register, then the input-output device puts the aforesaid flip-flop circuit into operation, thereby causing an instruction signal demanding data transfer by the DMA to be delivered to the CPU. At this time an address signal conducted through an address bus line specifies any of the addresses of the MMU 105. This address signal is read out of the address register. Each time a half word or one word of data is transferred by means of the MMU 105, a count previously stored in the address register is increased by 1 and a count previously made by the word counter is decreased by 1 (in the case of the 32-bit mode, an absolute number of 1 is replaced by 2). Where the above-mentioned operation is repeated, the contents of the data counter are finally reduced to zero. At this time, a data transfer termination detection circuit is put into operation to produce a signal denoting said termination to the DMACs 102, 103, 104. The input-output device actuates another flip-flop circuit for issuing an interrupt instruction to indicate the termination of data transfer, thereby causing said interrupt instruction to be conducted to the CPU 106 for termination processing. Where data is written in the input-output device, a signal demanding data transfer by the DMA is also produced, followed by the same operation as described above.

For increasing the speed at which data is processed by the conventional computer system, this invention makes it possible to replace only such devices as the CPU, memory and disk which have high data transfer rate by those which have wide data transfer width of 32 bits, with all the other input-output devices formed of the known types (namely, the IOC with 16 bit data transfer mode). In other words, the invention can improve the performance of a computer system at low cost. Further advantages of the invention are that the interchangeable application of the 16-bit and 32-bit modes is effected by means of a mode control line in accordance with an instruction signal issued from a device which is temporarily allowed to occupy a data bus line while said occupation lasts; and consequently, an apparatus using the 16-bit mode and that based on the 32-bit mode can be connected to a common DMA bus line, thereby increasing the efficiency of data transfer through a data bus line.

There will now be described by reference to FIG. 4 a data transfer system according to another embodiment of this invention. The parts of FIG. 4 which are the same as those on FIG. 1 are denoted by the same numerals, description thereof being omitted. According to this embodiment, 32-bit data read out of the CPU 106 and DMACs 102, 103, 104 can be written in any zone of the MMU 105 in byte units. Writing of the 32-bit data in the byte units is carried out by a zone-specifying signal. A zone designation or specifying line 151 is connected between the MCU 108 and the respective elements of the CPU 106 and DMACs 102, 103.

There will now be described by reference to FIG. 5 the peripheral units of the MMU 105 used in the embodiment of FIG. 4. With this MMU 105, each data word is formed of 32 bits, and an address is provided for each half word as in the embodiment of FIG. 1. The MMU 105 is further divided into 8-bit byte units, namely, into 4 zones, ZONE 0, ZONE 1, ZONE 2, ZONE 3. Therefore, a memory data line 115 is formed of 4 lines and each line is constructed by 8 bits. Likewise, a read data line 116 is formed of 4 lines and each line is constructed by 8 bits.

Figure 4:
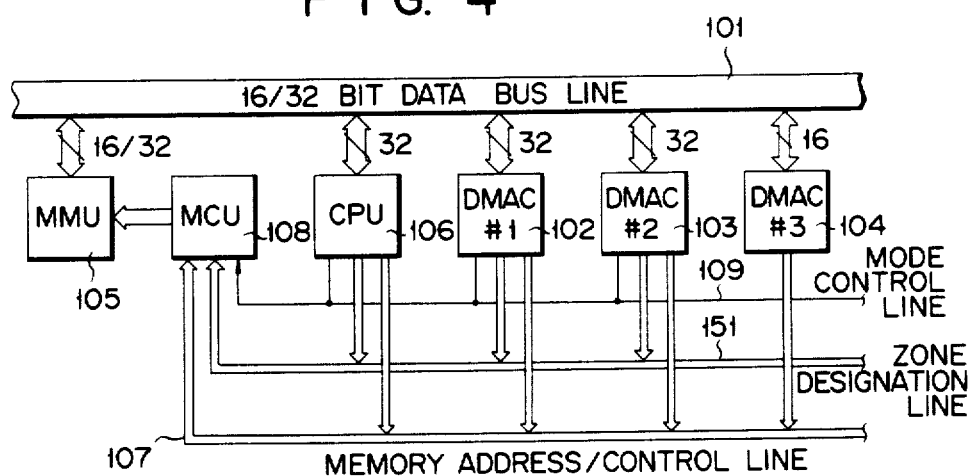
FIG. 4 is a block diagram showing the connection of a main memory, a CPU and DMACs according to another embodiment of the invention.

The data read-write operation carried out in the embodiment of FIG. 4, therefore includes 3 forms: the data read-write operation in the unit of 32 bits; the data read-write operation in the unit of 16-bits with respect to an even number or odd number address of the MMU 105; and the data write operation in the unit of 8 bits with respect to the four zones ZONE 0, ZONE 1, ZONE 2, ZONE 3.

Figure 6:
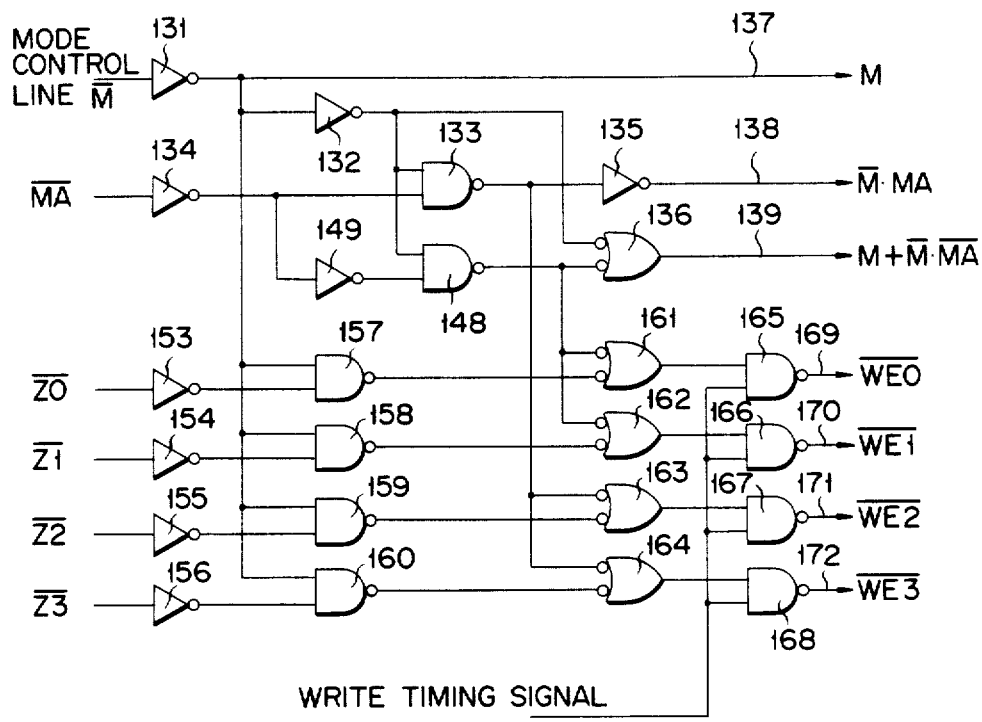
FIG. 6 is a circuit diagram of a memory control unit for generating a control signal to control the operation of the peripheral circuits of memory shown in FIG. 5.

FIG. 6 shows the circuit arrangement of a gate control signal generator and a generator of an enable signal allowing for the writing of data in the MMU 105, both generators being included in the MCU 108. In addition to the gate control signal generator of FIG. 3, FIG. 6 comprises four "write" enable signal generators allowing for the designation of any aforesaid zones ZONE 0, ZONE 1, ZONE 2, ZONE 3.

There will now be described by reference to FIGS. 5 and 6 the data read-write operation with respect to the MMU 105. Reference is first made to the data read-write operation in the 32-bit mode. In this case, for example, the DMAC 102 issues a mode control signal $\overline{M}$ to the mode control line 109 as described in connection with the embodiment of FIG. 3. Accordingly, the inverter 131 generates a high level signal, which is supplied as a gate control signal M to the line 137. This high level control signal M has its logic level changed to low by the inverter 132. The resultant low signal is supplied to one of the input terminals of the NAND circuit 133. As a result, the NAND circuit 133 produces an output signal having a high logic level. This high level signal has its logic level inverted to low by the inverter 135. Consequently, the line 138 is not energized, nor is the gate control signal $\overline{M}.MA$ operated. The negated input OR circuit 136 is supplied from the inverter 132 with a signal whose logic level has been inverted from high to low, and also from the NAND circuit 148 with a signal whose logic level is high. Eventually, therefore, said input OR circuit 136 outputs a high level signal. As a result, the line 139 is energized to produce the gate control signal $M + \overline{M}.\overline{MA}$.

In the case of the read-write operation in the 32-bit mode, the four zones ZONE 0, ZONE 1, ZONE 2, ZONE 3 designated by the zone designation line 151 all have the logic level set at low. Therefore, low level zone-specifying signals $\overline{Z0}$, $\overline{Z1}$, $\overline{Z2}$, $\overline{Z3}$ respectively have the logic levels changed to high by the corresponding inverters 153, 154, 155, 156. These high level signals are supplied to one of the input terminals of the corresponding NAND circuit 157, 158, 159, 160, the other input terminal of which is supplied from the inverter 131 with a signal whose logic level has been reversed from low to high. Therefore, said NAND circuits 157, 158, 159, 160 generate a low level signal, which is supplied to one of the input terminals of the corresponding negative input OR circuits 161, 162, 163, 164. Therefore, said OR circuits 161, 162, 163, 164 produce high level signals. These high level signals and a write timing signal having a high logic level are conducted to the corresponding NAND circuits 165, 166, 167, 168 which in turn generate a low level write enable signal. Consequently, the corresponding lines 169, 170, 171, 172 produce write enable signals $\overline{WE_0}$, $\overline{WE_1}$, $\overline{WE_2}$, $\overline{WE_3}$. Thus the gates 117, 118 are opened by the gate control signal M and M+$\overline{M}$.$\overline{MA}$ and further the write enable signals $\overline{WE_0}$, $\overline{WE_1}$, $\overline{WE_2}$, $\overline{WE_3}$ are applied to the MMU 105. Accordingly a 32-bit data is written in the specified address by the memory address.

In the case of reading 32-bit data of MMU 105 by the DMAC 102, the MCU 108 issues gate control signals M and M+$\overline{M}$.$\overline{MA}$ upon receipt of a mode control signal ($\overline{M}$="0") from the DMAC 102, as in the case of writing 32-bit data. The gate control signals M and M+$\overline{M}$.$\overline{MA}$ energize the gates 123, 122 of FIG. 5. As a result, the contents of the specified memory address of MMU 105 are read out of the DMAC 102. The 32-bit data thus read out is conducted to the data bus line 101 through the gate circuits 123, 122 and then to the DMAC 102.

The data read-write operation with respect to the CPU 106 and DMAC 103 is carried out in the same manner as described above.

There will now be described the control of the read-write operation of data in the 16-bit mode by the DMAC 104.

Where 16-bit data is written in an even number address of the MMU 105, the least significant bit signal $\overline{MA}$ of the memory address is "1", the $\overline{MA}$ signal becomes a low level through the inverter 134.

The DMAC 104 also is not connected to the mode control line 109, the mode control line signal $\overline{M}$ holding its high level. The line 137 does not produce the signal M since the high level signal becomes a low logic level through the inverter 131.

The low level signal through the inverter 131 is inverted to a high logic level by the inverter 132. Accordingly, the NAND gate 133 generates a high level signal. A signal from the inverter 135 whose logic level has been inverted from high to low is supplied to the line 138, which therefore does not generate a gate control signal $\overline{M}$.$\overline{MA}$.

The NAND circuit 148 is supplied with a high level signal from the inverter 149, and also with a high level signal from the inverter 132, eventually producing a low level signal. The negative input OR circuit 136 is supplied with not only said low level signal, but also a high level signal from the inverter 132, eventually generating high level signal. Accordingly, the line 139 outputs a gate control signal M+$\overline{M}$.$\overline{MA}$.

On the other hand, the DMAC 104 is not connected to the zone designation line 151, the zone signals $\overline{Z0}$, $\overline{Z1}$, $\overline{Z2}$, $\overline{Z3}$ are kept at a high logic level.

But, as described above, the low level signal from the NAND circuit 148 is applied to the one input terminal of the negative input OR circuits 161, 162 and the circuits 161, 162 produce high level signals. These signals and the write timing signal are applied to the NAND circuits 165, 166 and the circuits 165, 166 produce low level write enable signals.

Figure 5:
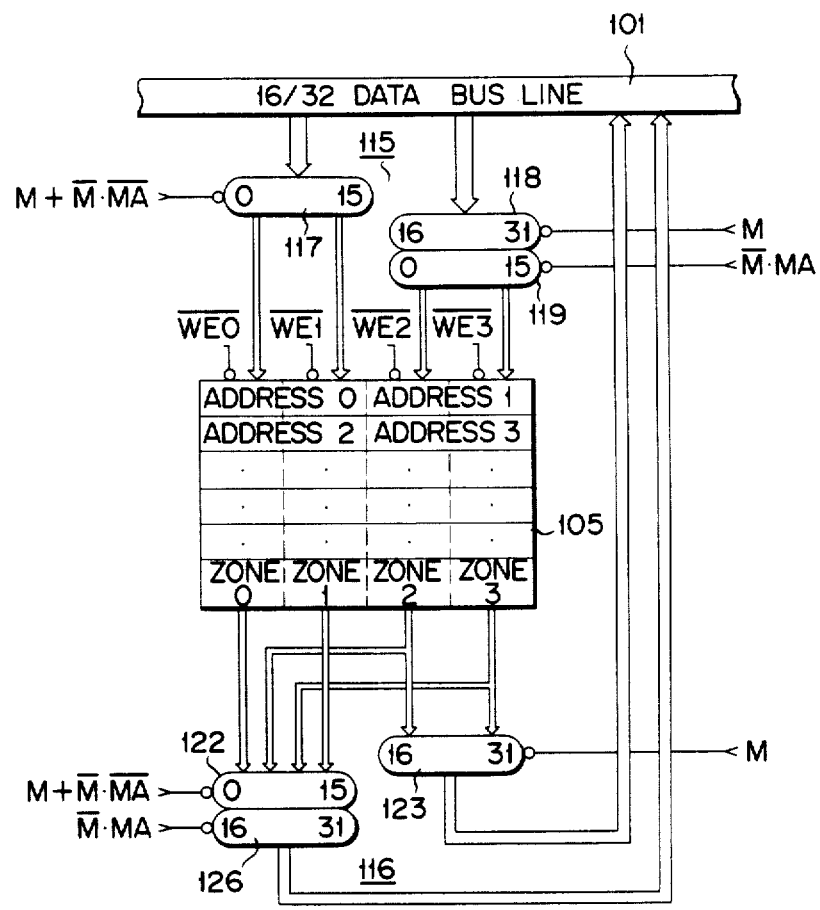
FIG. 5 is a detailed block diagram showing a connection between the data bus line and memory unit of FIG. 4.

As a result, the gate 117 of FIG. 5 is opened by the gate control signal M+$\overline{M}$.$\overline{MA}$. Further, the write enable signals $\overline{WE_0}$, $\overline{WE_1}$ are applied to the MMU 105. Therefore, the data is written in the even number address specified by the memory address.

No data, however, is written in the odd number address adjacent to the even number address.

In the case of reading 16-bit data from an even number address of the MMU 105 by the DMAC 104, the circuit of FIG. 6 generates gate control signal M+$\overline{M}$.$\overline{MA}$ upon receipt of a memory address signal from the DMAC 104 as in the case of writing the 16-bit data.

The gate 122 of FIG. 5 is energized by the gate control signal M+$\overline{M}$.$\overline{MA}$, causing 16-bit data in the even number address of data read out from the specified address of the MMU 105 by the memory address from the DMAC to be conducted through said gate 122 to the data bus line 101 and then to the DMAC 104.

Where 16-bit data is written in an odd number address of the MMU 105 by the DMAC 104, the least significant bit signal $\overline{MA}$="0" is applied to the circuit of FIG. 5 and the signal $\overline{MA}$ becomes a high logic level through the inverter 134. This high level signal is supplied to one of the input terminals of the NAND circuit 133, the other input terminal of which is supplied with a high level signal from the inverter 132. Consequently, the NAND circuit 133 generates a low level signal. This low level signal has the logic level changed to high, thereby causing the line 138 to output the gate control signal $\overline{M}$.$\overline{MA}$.

The NAND circuit 148 is supplied with a high level signal from the inverter 132 and also with a low level signal from the inverter 149, eventually generating a high level signal. The negative input OR circuit 136 is supplied with this high level signal. Another high level signal from inverter 132 is supplied to the other input terminal of circuit 136 which produces a low level output signal. Accordingly, the line 139 is not energized, nor is the gate control circuit M+$\overline{M}$.$\overline{MA}$ produced. The DMAC 104 is not connected to the zone designation line 151, the zone signals $\overline{Z0}$, $\overline{Z1}$, $\overline{Z2}$, $\overline{Z3}$ being kept at high logic levels. But a low level signal from the NAND circuit 133 is applied to the negated input OR circuits 163, 164 and the circuits 163, 164 produce high level signals. The NAND circuits 167, 168 are respectively supplied with a high level signal from the corresponding OR circuits 163, 164 and also with a write timing signal which is at a high logic level. As a result, the NAND circuits 167, 168 provide low level signals, causing the lines 171, 172 respectively to generate write enable signal $\overline{WE_2}$, $\overline{WE_3}$.

As shown in FIG. 5, therefore, the gate 119 is opened by the gate control signal $\overline{M}$.$\overline{MA}$ and further, the write enable signals $\overline{WE_2}$, $\overline{WE_3}$ are applied to the MMU 105.

Then a 16-bit data is written in the odd number address specified by the memory address. As mentioned in the example of FIG. 1, no data is written in the even number address adjacent to the odd number address. Reading of 16-bit data out of an odd number address of the MMU 105 can be effected in the same manner as in the case of said reading out of an even number address of the MMU 105.

Writing of data in the 8-bit byte unit can be carried out in the same manner as when data is written in the 16-bit unit. However, writing of data in the 8-bit byte unit is different from writing of data in the 16-bit unit only in that it is necessary to specify in which of the four zones ZONE 0, ZONE 1, ZONE 2, ZONE 3 the 8-bit data is to be written.

Namely, the write enable signals $\overline{WE_0}$, $\overline{WE_1}$, $\overline{WE_2}$, $\overline{WE_3}$ corresponding to the circuit of FIG. 6 are outputted and are applied to the MMU 105 by energizing the zone-specifying signals $\overline{Z0}$, $\overline{Z1}$, $\overline{Z2}$, $\overline{Z3}$ corresponding to the zone to be written at low logic levels. The embodiment of FIG. 5 enables data to be written in fifteen different modes.

There will now be described by reference to FIG. 7 a data transfer system according to still another embodiment of this invention. The parts of FIG. 7 which are the same as those of FIGS. 4 and 5 are denoted by the same numerals, description thereof being omitted.

Figure 7:
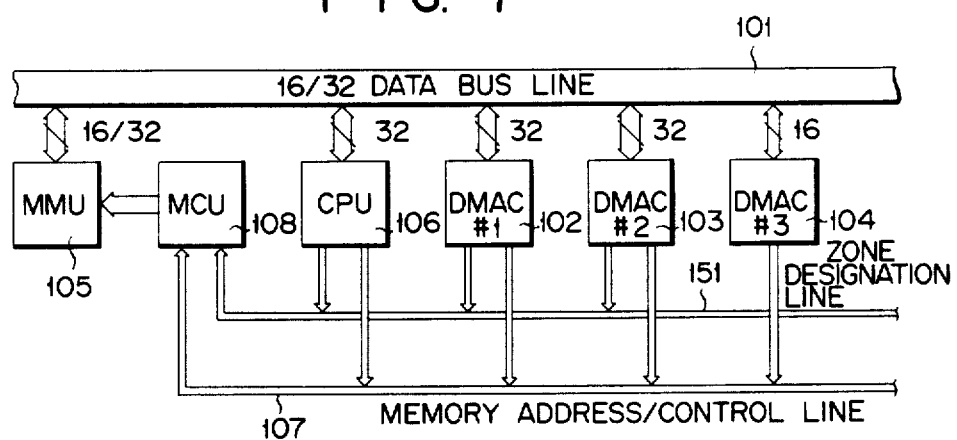
FIG. 7 is a block diagram showing the connection of a main memory, a CPU and the DMACs according to still another embodiment of the invention.

The embodiment of FIG. 7 is different from that of FIG. 4 in that the mode control line of FIG. 4 is omitted, and a zone designation line is made concurrently to act as a mode control line. In the embodiment of FIG. 4, where the mode control line 109 had its logic level changes to low, data was processed in the 32-bit unit and where said logic level was shifted to high, data was processed in the 16-bit mode.

In the embodiment of FIG. 7, data transfer in the 32-bit mode by the DMAC 102, 103 and the CPU 106 is carried out by causing all the zone-specifying lines to have their logic levels set at low. Writing of byte data is effected by energizing one of four zone signals ZONE 0, ZONE 1, ZONE 2, ZONE 3 a low logic level.

Data transfer in the 16-bit mode by the DMAC 104 is carried out by causing all the zone-specifying lines to be at a high logic level.

That is, the DMAC 104 is not connected to the zone designation line 151, all the zone designation lines being kept at a high logic level since the zone designation line 151 is not energized at a low logic level when the DMAC 104 is in operating mode.

With the embodiment of FIG. 7, the zone designation line 151 is formed of four unit lines as in the embodiment of FIG. 5. A zone-specifying signal conducted through any selected one of said four zone designation unit lines can be used by itself as a write enable signal for data writing in the MMU 105 in the 8-bit byte unit.

Figure 8:
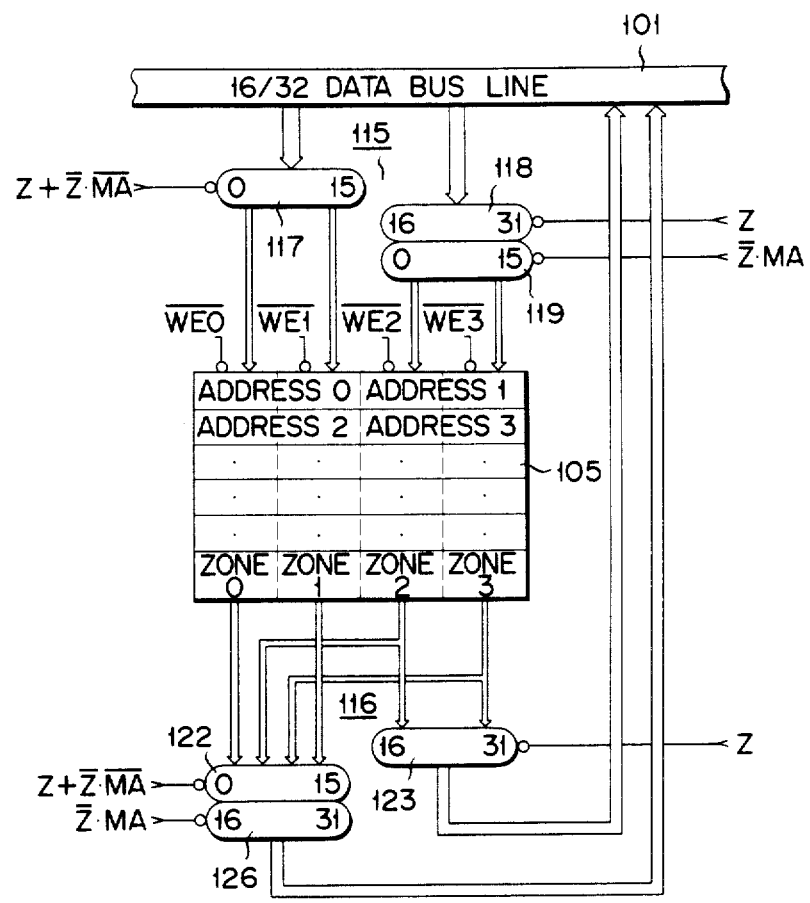
FIG. 8 is a detailed block diagram showing a connection between the data bus line and memory unit of FIG. 7.

There will now be described a data transfer system according to a further embodiment of this invention by reference to FIG. 8 showing the peripheral units of the MMU 105. The parts of FIG. 8 which are the same as those of FIG. 5 are denoted by the same numerals, description thereof being omitted.

With the embodiment of FIG. 8, the gates 117, 122 are opened by a gate control signal $Z+\overline{Z}.\overline{MA}$. The gates 118, 123 are opened by a gate control signal Z. The gates 119, 126 are opened by a gate control signal $\overline{Z}.MA$.

Figure 9:
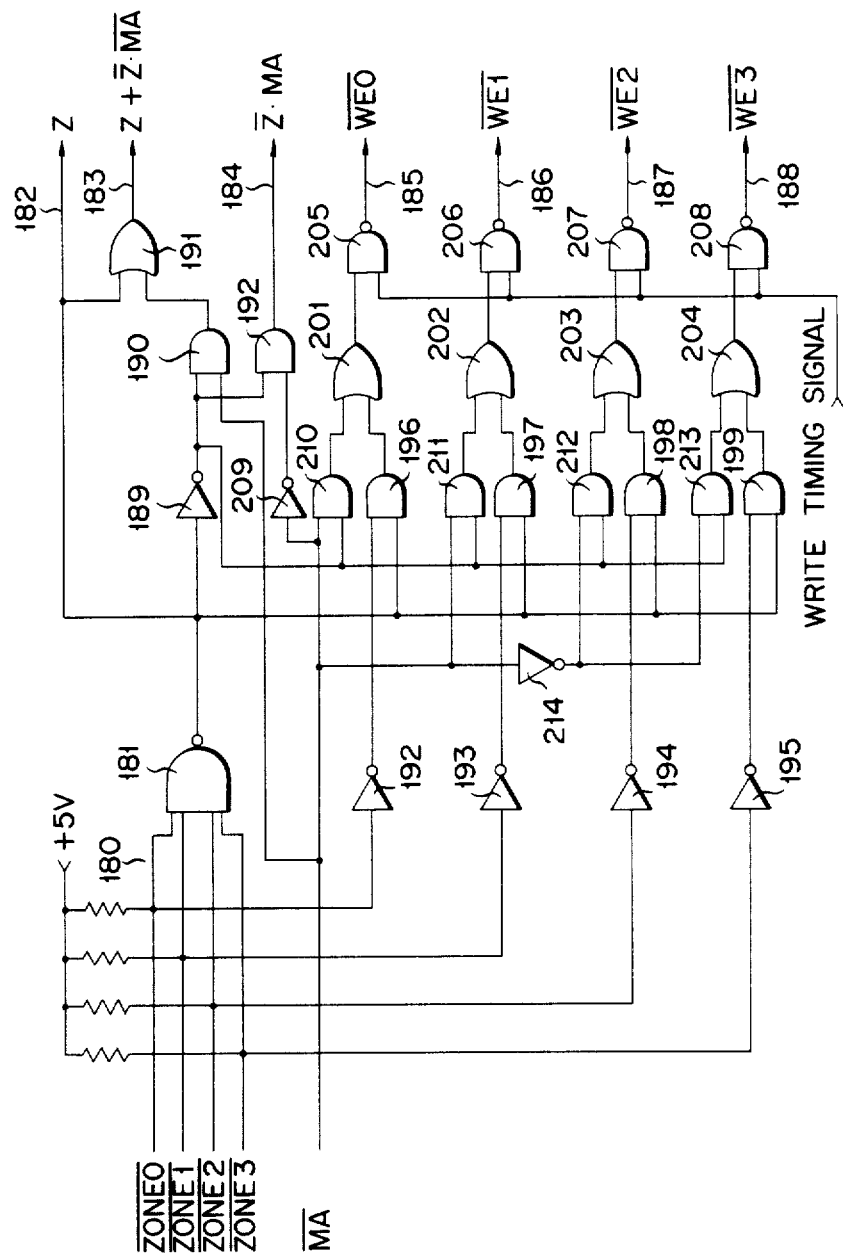
FIG. 9 is a circuit diagram of a memory control unit for generating a control signal to control the operation of the peripheral circuits of the memory shown in FIG. 8.

FIG. 9 indicates a gate control signal genator and write enable signal generator included in the MMU 105 used in the embodiment of FIG. 7. There will now be described a still another embodiment of the invention by reference to FIGS. 8 and 9.

Reference is first made to the access for the MMU 105 in 32-bit mode by the DMACs 102, 103 and the CPU 106.

Where the DMAC 102, for example, writes data in the 32-bit mode, the DMAC 102 energizes each of the zone signals $\overline{ZONE0}$, $\overline{ZONE1}$, $\overline{ZONE2}$, $\overline{ZONE3}$ at a low logic level.

As a result, the NAND circuit 181 produces a high level signal. Accordingly, a line 182 generates a gate control signal at a high logic level. A high level signal delivered from the NAND circuit 181 is supplied to an AND circuit 190 through an inverter 189. Therefore, the AND circuit 190 produces a low level signal, which is supplied to one of the input terminals of an OR circuit 191, the other input terminal of which is supplied with a high level signal from the NAND circuit 181. Consequently, the OR circuit 191 generates a high level signal. A line 183 has the logic level set at high and outputs a gate control signal $Z+\overline{Z}.\overline{MA}$. The low level signal from inverter 189 is supplied to one of the input terminals of an AND circuit 192, which in turn produces a low level signal. As a result, a line 184 has the logic level set at low, preventing a data control signal $\overline{Z}.MA$ from being generated.

The zone-specifying signals $\overline{ZONE0}$, $\overline{ZONE1}$, $\overline{ZONE2}$, $\overline{ZONE3}$ are respectively conducted to one of the input terminals of AND circuits 196, 197, 198, 199 through the corresponding inverters 192, 193, 194, 195. Said AND circuits 196, 197, 198, 199 are respectively supplied at the other input terminal with a high level signal from the NAND circuit 181 and generate a high level signal, which is conducted to one of the input terminals of OR circuits 201, 202, 203, 204, which produce a high level signal regardless of the logic level of a signal supplied to the other input terminal thereof. NAND circuits 205, 206, 207, 208 are supplied at one of the input terminals with the above-mentioned high level signal from the OR circuits 201, 202, 203, 204, and also supplied at the other input terminal with a write timing signal at high in logic level. As a result, the NAND circuits 205, 206, 207, 208 output write enable signals $\overline{WE_0}$, $\overline{WE_1}$, $\overline{WE_2}$, $\overline{WE_3}$ each at low in logic level.

As a result, the gates 117, 118 of FIG. 8 are opened by the gate control signal $Z+\overline{Z}.\overline{MA}$, and the MMU 105 is supplied with write enable signals $\overline{WE_0}$, $\overline{WE_1}$, $\overline{WE_2}$, $\overline{WE_3}$. Therefore, 32-bit data is written in the address of the MMU 105 specified by the memory address.

Where 32-bit data is read out of the MMU 105 by the DMAC 102, a certain circuit included in the MCU 108 of FIG. 3 generates gate control signals Z and $Z+\overline{Z}.\overline{MA}$ upon receipt of a zone-specifying signal from the DMAC 102 through output lines 182, 183. Said gate control signals Z and $Z+\overline{Z}.\overline{MA}$ respectively energize the gates 123, 122. 32-bit data is read out of the memory address of the MMU 105 selected by a zone-specifying signal delivered from the DMAC 102. The 32-bit data thus read out is passed on to the data bus lines 101 through the gates 123, 122 and then transferred to the DMAC 102.

Data transfer with respect to the CPU 106 and DMAC 103 is carried out in the same manner as described above. In the case of the memory access of the MMU 105 in the 16-bit mode by the DMAC 104, it is necessary to judge whether an even number or odd number address of the MMU 105 is to be used. Where the least significant bit of the memory address is "0", an even number address is selected. Where the least significant bit of the memory address is "1", an odd number address is specified.

Writing data in the even number address of the MMU 105, for example, will be described.

As it is clear from FIG. 7, the DMAC 104 is not connected to the zone designation line 151 and the zone signals ZONE0, ZONE1, ZONE2, ZONE3 are not at low logic energizing levels.

Therefore, the output of the NAND circuit 181 becomes a low level. Accordingly, the line 182 does not produce a gate control signal.

A high level signal is supplied to the one input terminal of the AND circuit 190 through the inverter 181 and to the other input terminal is supplied the least significant bit signal $\overline{MA}$ at high in logic level of the memory address.

Thus, the AND circuit 190 produces a high level signal. The high level signal is applied to the other input terminal of the OR circuit 191. Accordingly, the line 183 generates a gate control signal $Z+\overline{Z}.\overline{MA}$. The AND circuit 192 is supplied with a high level signal from the inverter 189 and also with a low level signal from the inverter 209. Therefore, the AND circuit 192 produces a low level signal, preventing the line 184 from generating a gate control signal $\overline{Z}.MA$.

On the other hand, a high level signal is supplied to the one input terminal of the AND circuits 210, 211 through the inverter 189 and to the other input terminals are supplied a high level least significant bit signal $\overline{MA}$ of the memory address. Therefore, the AND circuits 210, 211 produce high level output signals. The high level output signals are applied to the OR circuits 201, 202 to cause high level output signals. As a result, a high level signal and a high level write timing signal are applied to the NAND circuits 205, 206 to cause low level signals.

That is, the lines 185, 186 produce the write timing signals $\overline{WE}_0$, $\overline{WE}_1$.

On the other hand, a low level signal is applied to the AND circuits 212, 213 through the inverter 214 and further a high level signal is applied to the AND circuits 212, 213 through the inverter 109. As a result the circuits 212, 213 produce a low level signal.

The low level signal is applied to the NAND circuits 207, 208 through the OR circuits 203, 204 and also a high level write timing signal is applied, the circuits 207, 208 produce high level signals.

Therefore, the lines 187, 188 do not produce write enable signals $\overline{WE}_2$, $\overline{WE}_3$.

As a result, the gate 117 of FIG. 8 is opened by the gate control signal $Z+\overline{Z}.\overline{MA}$ and the write enable signals $\overline{WE}_0$, $\overline{WE}_1$ are applied to the MMU 105. Thus a 16-bit data is written in the even number address specified by the memory address.

No data is written in the odd number address adjacent to the even number address as described in the embodiment of FIG. 1.

Writing 16-bit data in an odd number address of the MMU 105 by the DMAC 104 will be described.

In the case of writing in the odd number address, the least significant bit $\overline{MA}$ of the memory address of FIG. 9 becomes low level.

The low signal $\overline{MA}$ becomes high level signal through the inverter 209 and is inputted to the one input terminal of the AND circuit 192. The NAND circuit 181 outputs the low level signal and the low level signal becomes a high level signal through the inverter 189 and is inputted to the other input terminal of the AND circuit 192. Accordingly, the AND circuit 192 produces a high level signal. The line 182 is at low level and the line 183 is also at low level since the OR circuit 191 does not produce a high level signal. Accordingly, the lines 182, 183 do not produce the gate control signals Z. $Z+\overline{Z}.\overline{MA}$.

Also, the low level least significant bit signal $\overline{MA}$ of the memory address becomes a high level signal through the inverter 214 and is inputted to the one input terminal of the AND circuits 212, 213. To the other input terminal of the circuits 212, 213, the high level signal of the inverter 189 is supplied. Accordingly, the AND circuits 212, 213 produce high level signal. The high level signal is inputted to the one input terminal of the NAND circuits 207, 208 through the OR circuits 203, 204.

To the other input terminal of the NAND circuits 207, 208 the high level write timing signal is inputted, the NAND circuits 207, 208 produce a low level signal. Therefore, the lines 187, 188 produce the write enable signals $\overline{WE}_2$, $\overline{WE}_3$. To the one input terminal of the AND circuits 210, 211, a low level signal MA is inputted and a low level signal from the NAND circuit 181 is inputted to the one input terminal of the AND circuits 196, 197. Therefore, the AND circuits 210, 211, 196, 197 produce a low level signal since each input condition of the circuits is not satisfied. Thus the NAND circuits 205, 206 do not produce a low level write enable signal $\overline{WE}_0$, $\overline{WE}_1$.

Accordingly, the gate circuit 119 of FIG. 8 is opened by the gate control signal $\overline{Z}.MA$ and further the write enable signals $\overline{WE}_2$, $\overline{WE}_3$ are applied to the MMU 105. Accordingly, a 16-bit data is written in the odd number address of the MMU 105 specified by the memory address.

No data is written in the even number address adjacent to the odd number address as in the embodiment of FIG. 4. In case of a read operation of the MMU 105 by the DMAC 104, as in the write operation described above, the gate control signal is produced from the circuit of FIG. 8 corresponding to the even number address or the odd number address. By the gate control signal, the corresponding gate is opened and the data is read out from the even number address or the odd number address and is outputted to the data bus line 101 to be transferred to the DMAC 104.

Data transfer using a part of the data bus line 101 (bit 0 to bit 15) is effected in the same manner as in the embodiments of FIG. 1 and FIG. 4.

Writing of data in the zone unit is effected by causing a signal specifying the zone in which data is to be written to have its logic level set at low, as described in connection with FIGS. 4 to 6.

For increasing the data-processing speed of the known computer system, this invention makes it possible to replace devices such as the CPU, memory and disk which have heretofore been regarded as capable of carrying out data transfer quickly by new devices which have a wide data transfer width and undertake said data transfer at a far faster rate, with all the other input-output devices formed of the known narrow data transfer width types. Therefore, this invention can increase the efficiency of a computer system at low cost. Further advantages of the invention are that a device temporarily allowed to occupy a data bus line can carry out data transfer during said occupancy either in the 16-bit or 32-bit mode in accordance with the contents of a signal for energizing a zone designation line; it is possible to design a computer system provided with DMA devices of the 16 bit and 32-bit mode types, thereby enabling the known 16-bit mode type DMA device to be connected to a data bus line without any modification; and a newly designed 32-bit mode type DMA device can allow for data transfer on the 32-bit unit and data writing in the byte unit.

What we claim is:

1. In a data processing system which includes a central processing unit with an n-bit word length, where n is a positive integer having a value greater than 7, a main memory, a plurality of direct memory access units and an n-bit data bus coupling the central processing unit, the main memory and the direct memory access units for transfer of data between the direct memory access units and the main memory, the improvement comprising a data transfer system for accessing the main memory, the data transfer system comprising:
   (a) said main memory being capable of storing n-bit full-words in byte units, each full-word made up of m bytes where n/m is the number of bits in one byte and said memory having a separate transfer enable input for each of said m bytes;
   (b) said direct memory access units comprising at least one first direct memory access unit which can receive and deliver n-bit full-words, and at least one second direct memory access unit which can receive and deliver n/2 bit half-words, since n/2 is an integer;
   (c) a plurality of gate circuits coupling the main memory and the data bus line;
   (d) first data transfer control means for controlling the gate circuits so that data transfer is achieved between the main memory and the first direct memory access unit, using n bits of the data bus line and an n-bit memory location when the first direct memory access unit has access to the main memory;
   (e) zone specifying means having m zone selection inputs from the Central Processing unit, one corresponding to each of said m bytes in said main memory and responsive to said zone selection inputs and a control output from said first data transfer control means indicative of data transfer between the main memory and the first direct memory access unit, for selectively providing at least one signal to said separate transfer enable inputs to enable, transfer of at least one byte of data between an n-bit memory location and said first direct memory access unit using a corresponding part of the n-bit data bus line and the first direct memory access unit whereby through use of said zone specifying means appropriate zones within an n-bit full-word or a half-word may be specified; and
   (f) second data transfer control means for controlling the gate circuits so that data transfer is achieved between the main memory and the second direct memory access unit, using n/2 bits of the data bus line and n/2 bits from an n bit memory location when the second direct memory access unit has access to the main memory.

2. The data transfer system according to claim 1, further comprising a memory control unit including said first and second data transfer control means and said zone specifying means, a common address/control line for transferring an address and a command from said first and second direct memory access units to said memory control unit, a mode control line for transferring a mode control signal from said first direct memory access unit to said memory control unit, and a zone designation line for transferring a zone specifying signal from said first direct memory access unit to the memory control unit, said zone specifying signal designating for transfer at least one byte from an n-bit memory location using a corresponding part of the n-bit data bus line wherein the memory control unit actuates the first data transfer control means and the zone specifying means in response to the mode control signal and the zone specifying signal transferred to the memory control unit from the first direct memory access unit on the mode control line and the zone designation line, respectively, and controls data writing in the main memory in accordance with the address and command transferred to the memory control unit from the first direct memory access unit on the common address/control line.

3. The data transfer system according to claim 1, further comprising a memory control unit including said first and second data transfer control means and said zone specifying means, a common address/control line for transferring an address and a command from the first and second direct memory access units to the memory control unit, and a zone designation line for transferring a zone specifying signal from said first direct memory access unit to the memory control unit, said zone specifying signal designating for transfer at least one byte within an n-bit memory location using a corresponding part of the n-bit bus line and selection of said first data transfer control means, wherein the memory control unit actuates said first data transfer control means and said zone specifying means in response to the zone specifying signal transferred from the first direct memory access unit on the zone designation line and controls data writing in the main memory in accordance with the address and command transferred to the memory control unit from the first direct memory access unit on the common address/control line.

4. The data transfer system according to claim 3, wherein said memory control unit actuates said second direct memory access unit and controls data reading and data writing from and to respectively, the main memory in accordance with the address and command transferred to said memory control unit from said second direct memory access unit on said common address/control line in the absence of a signal on said zone designation line from said first direct memory access unit.

5. The data transfer system according to claim 1 wherein said the system is adaptable to both an n equal to thirty-two and an n equal to sixteen and to both an m equal to four and an m equal to two.

6. The data transfer system according to claim 1 wherein n is thirty-two and m is four.

* * * * *